United States Patent

[11] 3,626,179

[72] Inventor Martin J. Cohen
West Palm Beach, Fla.
[21] Appl. No. 25,516
[22] Filed Apr. 3, 1970
[45] Patented Dec. 7, 1971
[73] Assignee Franklin GNO Corporation
West Palm Beach, Fla.

[54] HIGH TEMPERATURE METHOD AND APPARATUS FOR ANALYZING GASEOUS SAMPLES
20 Claims, 4 Drawing Figs.

[52] U.S. Cl. ................................................ 250/41.9 TF,
250/41.9 G, 250/41.9 S
[51] Int. Cl. ..................................................... H01j 39/34,
B01d 59/44
[50] Field of Search .......................................... 250/41.9 G,
41.9 D, 41.9 S

[56] References Cited
UNITED STATES PATENTS
2,699,505 1/1955 Usher .......................... 250/41.9 S
3,754,209 5/1966 Fite .............................. 250/41.9 SB
3,493,743 2/1970 Newman ...................... 250/41.9 S Primary Examiner—Archie R. Borchelt
Assistant Examiner—C. E. Church
Attorney—Raphael Semmes ABSTRACT: Analysis of gaseous samples containing inorganic trace substances which may be accompanied by organic interferents. The sample is passed through a high temperature pyrolizer or oxidizing burner to convert the complex organic materials to more simple organic materials or inorganic products of combustion. Components of the effluent of the burner are involved in ion-molecule reactions, which produce secondary ions that may be detected and measured. The ions may be segregated in accordance with their velocity in a drift chamber maintained at atmospheric pressure, may be analyzed in a mass spectrometer, or detected by condensation nuclei techniques. A measure of total organics in a sample is obtained by comparing instrument readings for a sample portion subjected to preliminary burning and another sample portion analyzed without preliminary burning.

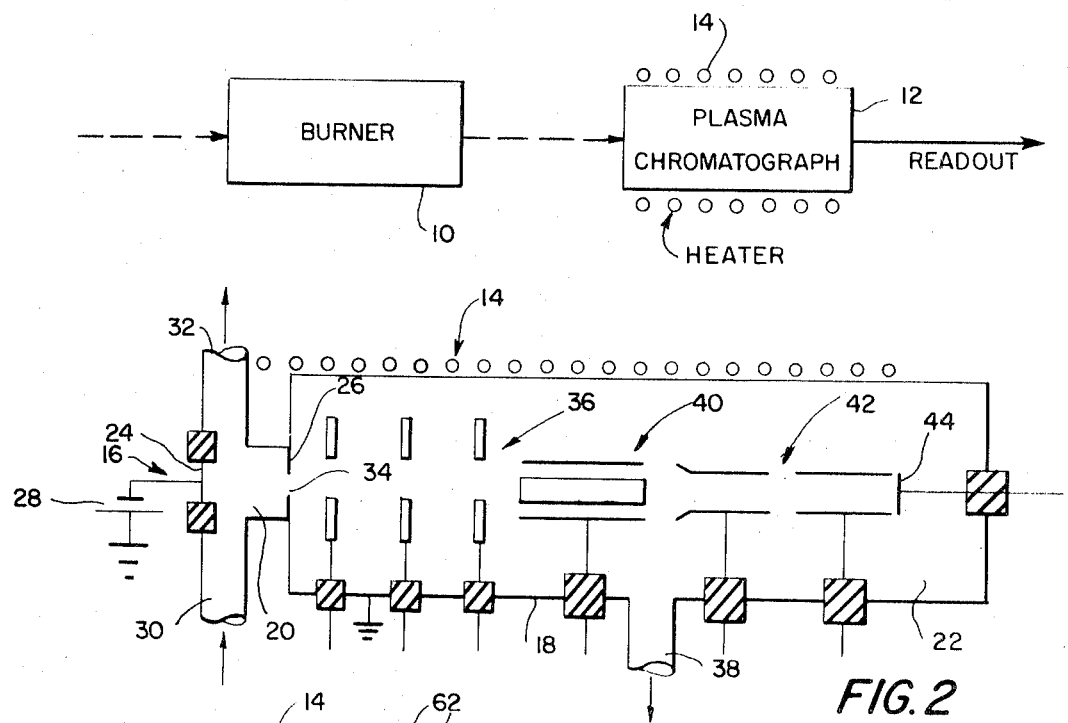
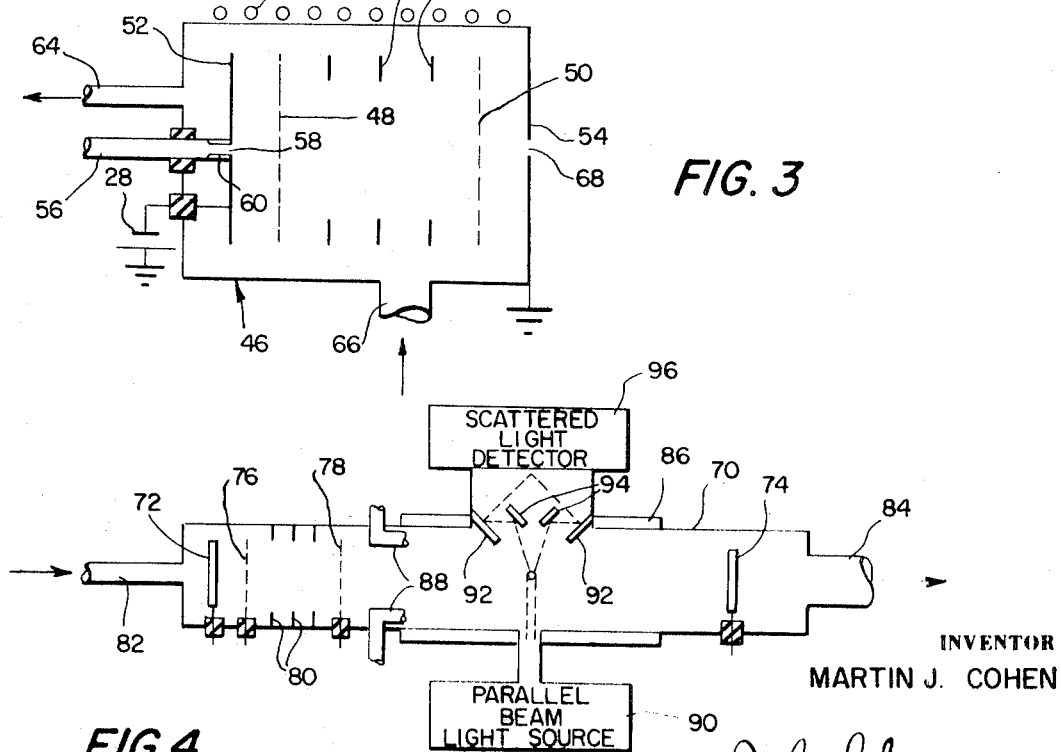

HIGH TEMPERATURE METHOD AND APPARATUS FOR ANALYZING GASEOUS SAMPLES

BACKGROUND OF THE INVENTION

This invention relates to methods and apparatus for detecting inorganic substances in gaseous samples and is particularly concerned with the measurement of inorganic pollutants and the like in the presence of organic interferents.

The copending application of Martin J. Cohen, David I. Carroll, Roger F. Wernlund, and Wallace D. Kilpatrick, Ser. No. 777,964, filed Oct. 23, 1968, and entitled "Apparatus and Methods for Separating, Concentrating, Detecting, and Measuring Trace Gases," discloses a system of "Plasma Chromatography," by which measurements upon trace gases can be performed at atmospheric pressure without modification of the parent materials. Moreover, the measurements can be performed very rapidly (in seconds) and at high sensitivity (of the order of one part in $10^{12}$, for example). Succinctly stated, the system of the copending application involves the formation of primary ions from a reactant gas and the reaction of the primary ions with molecules of trace substances to form secondary or product ions, which may be concentrated, separated, detected, and measured by virtue of the velocity or mobility of the ions in an electric field. When operated at room temperature, the apparatus of the copending application excels in the detection and measurement of heavy organic molecules or other molecules which readily become ionized by ion-molecule reactions, but certain substances, such as metals or oxides, are not readily detected at trace concentration levels. As set forth in the copending application of David I. Carroll, Roger F. Wernlund and Martin J. Cohen, Ser. No. 847,115, filed Aug. 4, 1969, entitled "Apparatus and Methods Employing Ion-Molecule Reactions in Batch Analysis of Volatile Materials," and as further set forth in the copending application of Martin J. Cohen, Ser. No. 864,046, filed Oct. 6, 1969, entitled "Apparatus and Methods for Enhancing the Measurement of Trace Gases," it is possible to operate the Plasma Chromatograph "hot," that is, at a temperature substantially higher than room temperature.

BRIEF DESCRIPTION OF THE INVENTION

It has been discovered, in accordance with the present invention, that by operating the Plasma Chromatograph at a high temperature, of the order of hundreds of degrees centigrade, it is possible to detect and measure inorganic materials which have adequate vapor pressure at such temperatures, but not at room temperature. Moreover, it is also possible to minimize the effects of organic interferents. It is accordingly an object of the present invention to provide improved methods and apparatus of the foregoing type.

Briefly stated, in accordance with the invention in a preferred embodiment, a gaseous sample, which may contain organic interferents in a host gas, as well as inorganic trace substances to be detected and measured, is passed through a high temperature pyrolizer or oxidizing burner, wherein the organic interferents are decomposed to produce simpler organic materials or inorganic products of combustion, such as oxides. In the burner, inorganic trace substances, such as free metals, may also be converted to oxides. The effluent from the burner is supplied to a Plasma Chromatograph, where, by ion-molecule reactions, molecules of the trace substances to be detected are converted to secondary ions, which are then detected and measured.

BRIEF DESCRIPTION OF THE DRAWINGS

The invention will be further described in conjunction with the accompanying drawings, which illustrate typical apparatus for carrying out the invention, and wherein:

FIG. 1 is a block diagram illustrating a system of the invention;

FIG. 2 is a diagrammatic longitudinal sectional view of one form of Plasma Chromatograph-mass spectrometer which may be employed in the invention;

FIG. 3 is a similar view of a modified form of the apparatus; and

FIG. 4 is a similar view of a Plasma Chromatograph incorporating a condensation nuclei detector which may be utilized in the invention.

DETAILED DESCRIPTION OF THE INVENTION

As shown in FIG. 1, in accordance with the invention, a gaseous sample, such as air containing pollutants, is introduced to a high temperature pyrolizer or oxidizing burner 10, which may include a hot wire, such as platinum or Nichrome, an arc or electrical discharge, a hydrogen flame, or other means for producing a high temperature, which may be up to 1000° C., for example. Oxygen or air, or sometimes a reducing atmosphere, may be added to the pyrolizer. The high temperature within the burner will destroy organic linkages, and thus any organic materials in the sample will be burned (or reacted) and thereby decomposed into simpler organics or inorganic products of combustion, such as water, carbon dioxide, and the oxides of the elements involved. Free metals in the sample will ordinarily be converted into their oxides.

The effluent from the burner is supplied to a Plasma Chromatograph 12 provided with a heater 14 for raising the temperature of the Plasma Chromatograph cell to a level of the order of hundreds of degrees centigrade, and perhaps up to 1000° C. In general, the high temperature at which the Plasma Chromatograph is operated is limited only by the presence of a significant Plasma Chromatograph signal due to possible electron emission from the components of the hot Plasma Chromatograph structure. Since typically the Plasma Chromatograph cell is built of materials which are poor electron emitters, such as stainless steel, molybdenum, tungsten, or noble metal envelope parts, tungsten guard rings and grids, and aluminum oxide insulation, the cell may readily be operated at high temperatures.

As disclosed in the foregoing copending applications, and as referred to briefly above, the Plasma Chromatography technique involves the reaction of trace molecules with primary ions of a reactant gas and the detection and measurement of the ions. As set forth in the aforesaid application Ser. No. 847,115 and in the copending application of Martin J. Cohen, David I. Carroll, Roger F. Wernlund and Wallace D. Kilpatrick, Ser. No. 828,402, filed May 27, 1969, entitled "Apparatus and Methods for Detecting and Identifying Trace Gases," the basic Plasma Chromatograph may be used in conjunction with a mass spectrometer and indeed may form the ion source of the mass spectrometer. Thus, as shown in FIG. 2, a Plasma Chromatograph cell 16 forms part of an envelope 18 having, in addition to the Plasma Chromatograph drift chamber 20, another chamber 22, which houses a mass spectrometer. In the simple form of Plasma Chromatograph illustrated in FIG. 2, the cell includes a pair of spaced electrodes 24 and 26, electrode 24 being shown insulated from the remainder of the envelope wall, which may be of metal. A high-voltage DC source, shown diagrammatically as a battery 28, provides a drift field between electrodes 24 and 26. If negative ions are to be detected, the negative pole of the battery will be connected to electrode 24 as shown, while if positive ions are to be detected, the polarity of the battery will be reversed.

The sample enters the drift cell chamber 20 by means of an inlet 30, and exhaust or outlet being provided at 32. The sample may be moved through the chamber by any suitable source of gas pressure, such as a small pump. In general, the pressure within the drift cell chamber will be maintained at atmospheric, although higher pressures may be utilized. It is important, however, that the pressure in the chamber be maintained at a level such that the mean free path length of ions in the chamber is very much less than the dimensions of the chamber, in particular, the dimensions of the reaction region.

Associated with electrode 24 is an ionizer, such as a layer of nickel 63 applied to the electrode. Other types of ionizers, such as a hydrogen flame source or an RF source, may be employed. Primary ions of a reactant gas, which may be admitted to the drift chamber along with the sample or separately, are formed adjacent to electrode 24. The reactant gas may be oxygen, for example, which may be added to the burner 10, if desired, and the primary ions may be positive or negative oxygen ions. The primary ions react with the molecules of the trace substances within the sample adjacent to electrode 24, and a mixed population of ions drifts toward electrode 26. Some of these ions pass through a small aperture 34 in electrode 26 and enter chamber 22, where they may be focused into a beam by an ion lens shown diagrammatically as a series of apertured discs 36. A vacuum pump, connected to the exhaust outlet 38 of chamber 22, maintains the pressure in chamber 22 at a low level relative to the pressure in chamber 20. For example, the pressure in chamber 22 may be $10^{-4}$ Torr. Thus, neutral molecules within chamber 22 are pumped away.

Appropriate potentials are applied to the electrodes within chamber 22 to cause the ion beam to enter the mass spectrometer, which may be a conventional type, such as the quadrupole type generally indicated at 40. By appropriate adjustment of the potentials of the quadrupole structure, ions of selected mass are accelerated into an ion detector 42, which may be an electron-multiplying type, such as the Bendix Channeltron. The output electrode 44 is connected to suitable readout apparatus, such as a signal averaging computer, which may be Fabri-Tek Model 1070, manufactured by Fabri-Tek Instruments, Inc. of Madison, Wisconsin. Heater 14 may be employed to raise the temperature of the mass spectrometer, as well as the Plasma Chromatograph, and thereby avoid the deposition of trace material on the mass spectrometer elements. If the mass spectrometer employs a photomultiplier tube, a turret or similar arrangement may be employed to change the tube periodically.

FIG. 3 illustrates a modified type of Plasma Chromatograph which may be employed in the invention. As disclosed in the aforesaid application Ser. No. 828,402, this type of Plasma Chromatograph cell 46 may employ a pair of spaced shutter-grid ion gates 48 and 50 for segregating the ions in the drift cell into groups depending upon their drift velocity. The principal electrodes are shown at 52 and 54, the sample being admitted through an inlet tube 56, which leads to a central aperture 58 in electrode 52. Within the inlet tube 56, adjacent to the aperture, is the ionizer 60. A series of guard rings 62 is provided to maintain the uniformity of the drift field between the principal electrodes. An exhaust outlet is provided at 64. A further inlet is provided at 66 to receive nonreactive buffering gas, as described in the copending application of David I. Carroll, Martin J. Cohen and Roger F. Wernlund, Ser. No. 780,851, filed Dec. 3, 1968, entitled "Apparatus and Methods for Separating, Detecting, and Measuring Trace Gases with Enhanced Resolution." Ion gates 48 and 50 are opened sequentially by pulses supplied from suitable grid drive circuits. The opening of grid 48 passes a group of ions to the drift space between the grids. At a later time, grid 50 is opened to pass selected ion species, which have separated from other species due to the difference in drift velocity. If a mass spectrometer is employed in conjunction with the Plasma Chromatograph, some of the ions passed by grid 50 will pass through aperture 68 in electrode 54 to the mass spectrometer. However, if a mass spectrometer is not employed, electrode 54 may be imperforate, and the Plasma Chromatograph output may be taken directly from this electrode.

An important purpose of the invention is to permit the detection of the basic air pollutant materials, such as sulfur dioxide, lead oxide, nitrogen oxide, or halogens, etc., without interference from organic materials. At several hundred degrees centigrade, many inorganic materials, such as oxides of arsenic, lead, phosphorus, selenium, sodium, potassium, and sulfur, have a vapor pressure corresponding to a concentration of molecular materials of $10^{-10}$ parts or more. Such concentrations are readily detected by the Plasma Chromatography method. The strong response which would normally be produced by organic materials in Plasma Chromatograph measurements is minimized by the conversion of these materials to simpler organic or inorganic constituents in the burner.

A measure of the total organics in the sample may be obtained by a comparison technique, a portion of the sample being passed through the burner and measured in the manner described above, and another portion being measured directly without passing through the burner. Organics may be removed from the sample by other types of pretreatment, such as passing the sample through activated charcoal or passing the sample over magnesium perchlorate.

The observation of lead oxide, a common pollutant, may be considered as typical of the types of observations which may be performed in accordance with the invention. For example, at 400° C., the vapor pressure of lead oxide is $1.5 \times 10^{-7}$ Torr, and at 500° C., the pressure rises to $2 \times 10^{-5}$ Torr. This represents an entirely sufficient amount of material to be observable in atmospheric air. Typically, the saturation vapor pressure of lead oxide at 450° C. is equivalent to 30 micrograms in 1 cubic meter of air, a very high level of pollution. The invention may be employed to observe the oxides, for example, of antimony, cadmium, molybdenum, nitrogen, osmium, and zinc, as well as those mentioned above. Halogens may be observed elementally or in other forms (for example, hydrochloride).

The embodiment of FIG. 4 illustrates the application of condensation nuclei detection techniques to the invention. In this embodiment, the envelope 70 contains principal electrodes 72 and 74 of the Plasma Chromatograph (between which a drift field is established in the usual manner), ion gate grids 76 and 78, and guard rings 80, as in the embodiment of FIG. 3. The envelope has an inlet 82 and an outlet 84 and is partially surrounded by a cooling jacket 86 of conventional type. If lead evaporated in the burner 10, for example, to form lead oxide, is diluted with lead-free air, the mixture can be cooled, and condensation of the lead into clusters will not occur. Thus, the charged lead oxide trace molecules may be treated in the drift chamber in the usual manner. However, these particles may be caused to form water or other aerosol droplets by providing an atmosphere that is super-saturated in such vapor, the aerosol being formed by condensation upon the charged ion nuclei. Under-saturated volatile and gas mixture is inserted through the pipes or nozzles 88, and aerosol droplets grow about the charged molecules as the gas is cooled by the cooling jacket. Each aerosol particle then becomes large enough for detection by a standard optical scattering device, such as the Royco Model 220 Detector or the General Electric Condensation Nuclei Detection Head indicated diagrammatically in FIG. 4 by the parallel beam light source 90, mirrors 92 and 94, and scattered light detector 96, all of which are well known in the art. The portion of the drift chamber preceding the detector may be heated to minimize lead oxide condensation before the detector.

While preferred embodiments of the invention have been shown and described, it will be apparent to those skilled in the art that changes can be made in these embodiments without departing from the principles and spirit of the invention, the scope of which is defined in the appended claims. Accordingly, the foregoing embodiments are to be considered illustrative, rather than restrictive of the invention, and those modifications which come within the meaning and range of equivalents of the claims are to be included therein.

The invention claimed is:

1. A method of detecting an inorganic trace substance in a sample which may also contain organic interferents, comprising passing said sample through a high temperature burner, reacting molecules of trace substance in the gaseous effluent of said burner with primary ions to produce secondary ions, and detecting at least some of said secondary ions so as to distinguish said ions.

2. A method in accordance with claim 1, wherein the reacting step takes place in a chamber, the interior pressure of which is maintained at a level sufficient to ensure that the mean free path length of ions in said chamber is substantially less than the dimensions of the chamber.

3. A method in accordance with claim 2, wherein said ions are subjected to a drift field.

4. A method in accordance with claim 3, wherein said ions are segregated in said drift field in accordance with their drift velocity.

5. A method in accordance with claim 2, wherein at least some of said ions are subjected to mass analysis in a chamber, the interior pressure of which is maintained at a level such that the mean free path length of ions in that chamber is substantially greater than that in the first-mentioned chamber.

6. A method in accordance with claim 2, further comprising applying heat to said chamber to prevent the deposit of trace substances therein.

7. A method in accordance with claim 2, wherein said burner is operated at a temperature of the order of 1000° C.

8. A method in accordance with claim 2, wherein said chamber is heated to a temperature of the order of at least hundreds of degrees centigrade.

9. A method in accordance with claim 2, wherein the gaseous effluent from said burner is diluted and cooled, and wherein the detection of said ions is accomplished by a condensation nuclei technique.

10. A method of detecting a trace substance in a carrier gas, which may contain organic interferents, by the use of detection apparatus of known sensitivity, where the vapor pressure of said substance in said carrier gas at room temperature is insufficient to permit substantial detection of said substances by said apparatus in the presence of such interferents, which comprises heating a sample containing said substance to a temperature at which said interferents are pyrolized and the vapor pressure of said substance in said carrier gas is sufficient to permit substantial detection of said substance by said apparatus, reacting molecules of said substance in the carrier gas with primary ions to form secondary ions in a chamber of said apparatus, maintaining the pressure in said chamber at a level sufficient to ensure that the mean free path length of ions therein is much less than the dimensions of the chamber, segregating said ions in accordance with their mobility in said field, and detecting a substantial number of said secondary ions so as to distinguish said ions.

11. A method in accordance with claim 10, wherein said chamber is heated to a temperature of the order of hundreds of degrees centigrade.

12. Apparatus for detecting trace substances, which comprises a high temperature burner, means for passing a sample containing a trace substance through said burner, means including a chamber for reacting primary ions with trace molecules of gaseous effluent from said burner to produce secondary ions, means for detecting at least some of said secondary ions so as to distinguish said ions, and means for maintaining the pressure in said chamber at a level sufficient to ensure that the mean free path length of said ions in said chamber is much less than the dimensions of said chamber.

13. Apparatus in accordance with claim 12, wherein said burner has means for operating the same at a temperature of the order of hundreds of degrees centigrade.

14. Apparatus in accordance with claim 12, further comprising means for heating said chamber to a temperature of the order of hundreds of degrees centigrade.

15. Apparatus in accordance with claim 12, further comprising means for subjecting said ions to a drift field.

16. Apparatus in accordance with claim 15, further comprising means for segregating said ions into groups in accordance with their drift velocity is said field.

17. Apparatus in accordance with claim 12, further comprising means for analyzing said ions in accordance with their mass.

18. Apparatus in accordance with claim 12, wherein said detecting means comprises a condensation nuclei detector.

19. A method of detecting a trace substance in a sample which may also contain organic interferents, comprising heating said sample to a temperature at which said interferents are pyrolized, then reacting molecules of said trace substance in the gaseous effluent resulting from the pyrolizing with primary ions to produce secondary ions, and detecting at least some of said secondary ions so as to distinguish said ions.

20. A method of detecting a trace substance in a carrier gas by the use of detection apparatus of known sensitivity where the sensitivity of said apparatus is not sufficient to permit substantial detection of said substance in said carrier gas, comprising heating a sample containing said substance in the presence of an oxidizing carrier gas atmosphere to a temperature at which said trace substance is oxidized by said atmosphere to produce an oxide of said substance in sufficient quantity in said carrier gas atmosphere for substantial detection by said apparatus, reacting molecules of the oxidized trace substance with primary ions to produce secondary ions in said apparatus, and detecting a substantial number of said secondary ions so as to distinguish said ions.

* * * * *